Jan. 30, 1934.   I. M. COLBETH   1,944,926
MEASURING INSTRUMENT OR TESTING DEVICE
Filed June 27, 1931
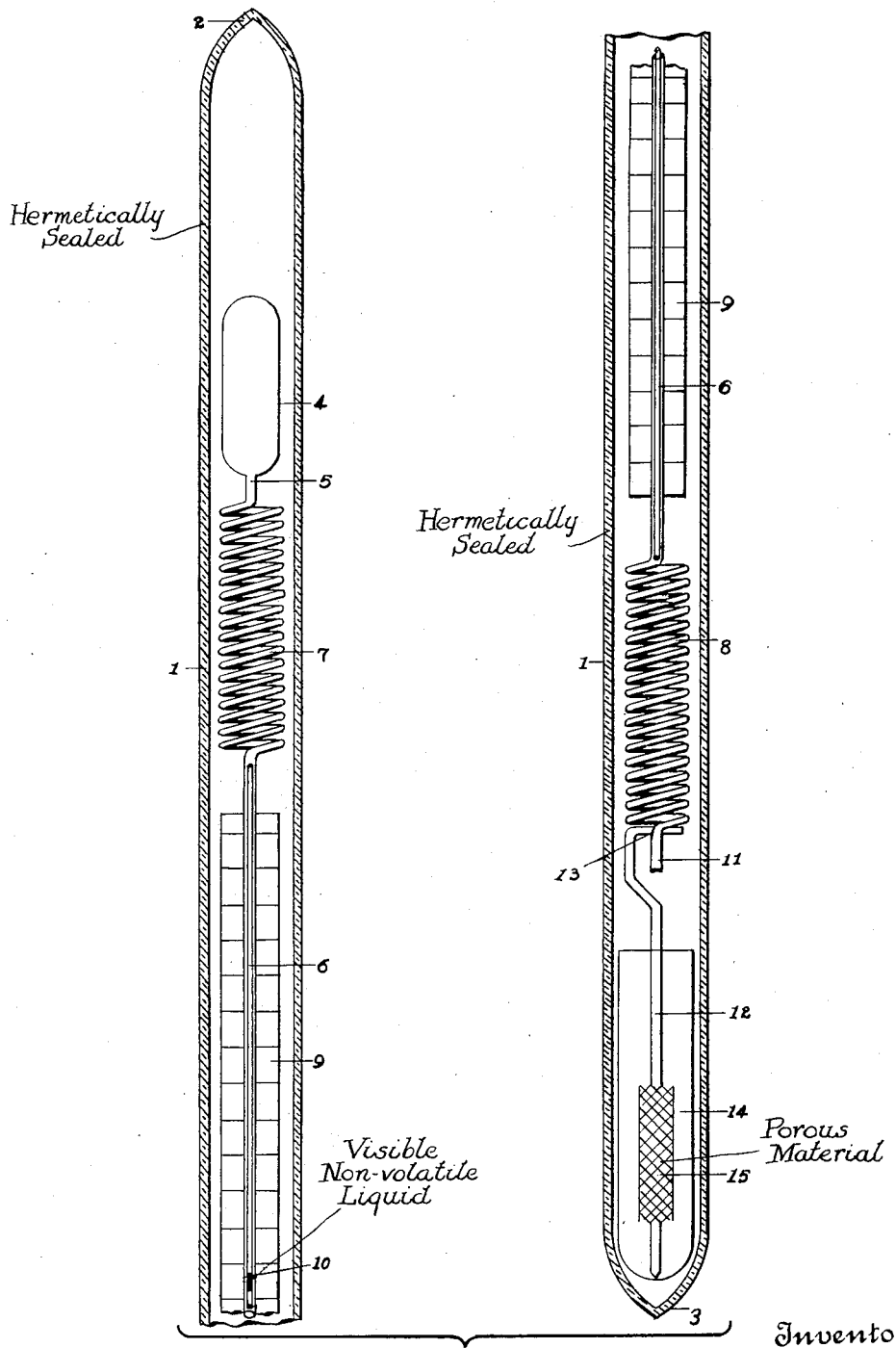
Inventor
Ivor Milton Colbeth
By his Attorneys
Gifford, Sewell & Burgess Patented Jan. 30, 1934

1,944,926

UNITED STATES PATENT OFFICE 1,944,926

MEASURING INSTRUMENT OR TESTING DEVICE

Ivor Milton Colbeth, Belleville, N. J., assignor to The Baker Castor Oil Company, New York, N. Y., a corporation of Delaware Application June 27, 1931. Serial No. 547,283

7 Claims. (Cl. 23—253)

This invention relates to a device by means of which tests of material can be made or measurements of changes in the material can be ascertained. The invention will be particularly described in connection with testing oils or fats to ascertain their liability to become rancid, but it is to be understood that the invention is not restricted to this particular use.

The device may be made entirely of glass and comprises a hermetically sealed tube or chamber in which the material to be tested is placed and is permitted to undergo changes which indicate its characteristics or show the nature of the material. The chamber also contains a hollow bulb to which a small glass tube of considerable length is connected having a liquid plug therein which changes in position along a graduated scale. This change is due to pressure changes that have resulted from changes in the material that is being tested.

The invention will be understood from the description in connection with the accompanying drawing which shows a side view of a device in two parts in order to have it on a large enough scale to avoid confusion.

In the drawing the reference character 1 indicates a long glass tube or chamber which is hermetically sealed at its opposite ends as indicated at 2 and 3.

A hollow bulb 4 is located in the tube or chamber 1 and the end 5 of this bulb is connected to a long glass tube of small diameter. This tube comprises a straight portion 6 and may have coiled portions 7 and 8 at the opposite ends of the straight portion 6 so that a very long tube of this sort can be contained in the container 1 without making the latter of an inordinate length.

A graduated scale 9 is attached to the straight part 6 of the small tube in any convenient way and a plug 10 of visible non-volatile liquid, such as mercury, is located in the portion 6 of the small tube so that its position along the scale 9 is readily observed. The lower open end 11 of the small tube may rest upon and be supported by a glass rod 12, the upper end 13 of which is bent for this purpose.

A glass tube 14, such as a test tube, having a smaller external diameter than the internal diameter of the tube or chamber 1 is placed in the lower portion of the chamber 1 and the rod 12 extends into the tube 14 and supports a mass or quantity of porous material 15.

The mass of porous material 15 is preferably made of curled Austrian glass wool by packing the same into a Pyrex test tube about 15 by 130 mm. The tube and contents are then uniformly heated to dull redness and plunged while hot into cold water to break the tube and leave the glass plug. This plug is white and strong enough to be handled without being broken. The plug or mass of porous material is then put upon the glass rod 12 and is held in place by friction.

Before locating the mercury plug 10 in the straight portion 6 of the small tube the bulb 4 and small tube should be thoroughly cleaned with a hot cleaning mixture of potassium bichromate and sulphuric acid, for example, and then should be rinsed out with methyl alcohol and low boiling petroleum ether, for example. The mercury plug may be located in place, after cleaning the bulb 4 and small tube, by heating the bulb 4 and dipping the end 11 of the small tube in mercury, whereupon the bulb 4 is permitted to cool. As soon as a short column of mercury has entered the end 11 the tube is withdrawn from the mercury and when the bulb 4 has finally cooled the mercury plug 10 is thereby drawn into the straight portion 6 of the small tube. The coiled portions 7 and 8 of the tube are provided to avoid the danger of the mercury plug escaping from the small tube due to expansion or contraction of the air in the bulb 4.

The operation of the instrument or device will now be described in connection with testing an oil to determine its tendency to oxidize or become rancid. The oil to be tested may be dissolved in a solvent, such as benzol or alcohol, and a measured quantity of the solution is introduced into the porous mass 15 after which the solvent is evaporated leaving the oil evenly distributed in the pores. The rod 12 carrying the oil-soaked mass 15 of porous material is introduced with the test tube 14 into the chamber 1 and the bulb and small tube are put in place in the chamber 1 and the chamber then sealed, care being taken that there is only dry air in the chamber. The oxidation of the oil by the oxygen of the air in the chamber 1 decreases the pressure because of the absorption of the oxygen so that the mercury plug 10 moves along the scale 9. By noting the amount of movement of the mercury plug in a given time the rate of oxidation of the oil is determined and may be compared with other oils or fats by a similar determination.

When it is desired to accelerate changes in materials that are to be tested by this device by heat, the device may be heated in any convenient way, as by immersing it in hot oil.

When it is desired to accelerate changes in materials that are to be tested by means of ultra-violet light, the device may be exposed to ultra-violet light, and the changes noted.

The changes in pressure in the bulb 4 and chamber 1 due to heat alone will not change the position of the mercury plug 10 when the two have reached the same temperature, so that changes in the position of the mercury plug 10 will be independent of the temperature. The volume inside the chamber 1 compared to the volume inside the bulb 4 and small tube up to the mercury plug is very large so that the drop in pressure in the chamber 1 is almost directly proportional to the amount of oxygen that is absorbed by the oil and the movement of the mercury plug on the scale represents this change.

After the oil has been oxidized the chamber 1 may be opened, the porous material containing the oxidized oil removed and the oil can then be analyzed, if desired. The residual gases may also be examined.

Although the device has been described in connection with the testing of oil to determine its tendency to oxidize or its rate of oxidation, the device may be used for various other purposes, such as: micro-gas analyses; micro-molecular weight determinations; vapor pressure determinations; humidity determinations; selective adsorption determinations; coefficient of expansion determinations; solution volume determinations; molecular association; molecular dissociation; rate of catalytic gas reaction involving change in volume, and moisture determinations in grains and a great many other uses where volume changes take place.

I claim:

1. In a testing device, a closed chamber, a gas-filled bulb, a tube connected to said bulb and communicating with the interior of said chamber, a liquid plug in said tube and a mass of porous material in said chamber exposed to the medium in said chamber.

2. In a testing device, a closed chamber, a gas-filled bulb, a tube connected to said bulb at one end and having its other end open and communicating with the interior of said chamber, a liquid plug in said tube and a mass of porous material in said chamber exposed to the medium in said chamber.

3. In a testing device, a closed chamber, a gas-filled bulb, a tube connected to said bulb the tube being open at its free end, a liquid plug in said tube, said bulb and tube being positioned in said chamber, a mass of porous material in said chamber, and a rod supporting said mass of material, bulb and tube.

4. In a testing device, a closed chamber, a gas-filled bulb, a tube connected to said bulb the tube being open at its free end, a liquid plug in said tube, said bulb and tube being positioned in said chamber, a mass of porous material in said chamber, a rod supporting said mass of material, bulb and tube, and an open tube in said chamber in which said rod rests.

5. In a testing device, a closed chamber, a gas-filled bulb, a tube connected to said bulb at one end, said tube having a straight portion and coiled portions at opposite ends of said straight portion, and a plug of mercury in said straight portion, said tube at its other end being in communication with said chamber.

6. In a testing device, a closed chamber, a gas-filled bulb, a tube connected to said bulb having a straight portion and coiled portions at opposite ends of said straight portion, said bulb and tube being positioned in said chamber, a plug of mercury in said straight portion, and a graduated scale adjacent said straight portion.

7. In a testing device, a closed chamber, a gas-filled bulb, a tube connected to said bulb and communicating with the interior of said chamber, a movable plug in said tube and a mass of curled Austrian glass wool in said chamber exposed to the medium in said chamber.

IVOR MILTON COLBETH.